(12) United States Patent
Drzewiecki

(10) Patent No.: US 6,553,844 B2
(45) Date of Patent: Apr. 29, 2003

(54) PROPERTY-INDEPENDENT VOLUMETRIC FLOWMETER AND SONIC VELOCIMETER

(75) Inventor: Tadeusz M. Drzewiecki, Rockville, MD (US)

(73) Assignee: metaSensors, Inc., Rockville, MD (US)

( * ) Notice: Subject to any disclaimer, the term of this patent is extended or adjusted under 35 U.S.C. 154(b) by 0 days.

(21) Appl. No.: 10/039,759

(22) Filed: Oct. 29, 2001

(65) Prior Publication Data

US 2002/0124660 A1 Sep. 12, 2002

Related U.S. Application Data

(60) Provisional application No. 60/162,200, filed on Oct. 29, 1999, and provisional application No. 60/244,100, filed on Oct. 27, 2000.

(51) Int. Cl.⁷ ............................. G01F 1/20; F15C 1/08
(52) U.S. Cl. ..................... 73/861.19; 137/835
(58) Field of Search ................ 73/861.19, 861.21; 137/820, 828, 835

(56) References Cited

U.S. PATENT DOCUMENTS

| | | | |
|---|---|---|---|
| 3,158,166 A | | 11/1964 | Horton et al. |
| 3,273,377 A | | 9/1966 | Terterman et al. |
| 3,373,600 A | | 3/1968 | Taplin |
| 3,640,133 A | | 2/1972 | Adams |
| 3,756,068 A | | 9/1973 | Villarroel et al. |
| 4,107,990 A | * | 8/1978 | Ringwall ............... 73/861.19 |
| 4,150,561 A | | 4/1979 | Zupanick |
| 4,244,230 A | | 1/1981 | Bauer |
| 4,610,162 A | * | 9/1986 | Okabayashi et al. ...... 73/861.19 |
| 4,976,155 A | * | 12/1990 | Challandes ............. 73/861.19 |
| 5,063,786 A | * | 11/1991 | Sanderson et al. ....... 73/861.19 |
| 5,339,695 A | * | 8/1994 | Kang et al. ............ 73/861.19 |
| 6,076,392 A | | 6/2000 | Drewiecki |

* cited by examiner

*Primary Examiner*—Harshad Patel
(74) *Attorney, Agent, or Firm*—Edell, Shapiro & Finnan LLC

(57) ABSTRACT

A single fluidic feedback oscillator incorporates two independent time event measurement means, resulting in a highly accurate volumetric flowmeter that is independent of the properties and composition of the flowing fluid. Under certain circumstances, when the relationship between speed of sound and specific heat of the fluid is generally known, the oscillator provides for a highly accurate sonic velocimeter and consequently can be used as a calorimeter. The main components of the invention are a fluidic amplifier oscillator, and two sets of sensors located at separate locations in either the feedback channels of the oscillator or in the oscillating jet flow region.

29 Claims, 2 Drawing Sheets

PROPERTY-INDEPENDENT VOLUMETRIC FLOWMETER AND SONIC VELOCIMETER

CROSS-REFERENCED TO RELATED APPLICATIONS

This application claims priority from U.S. Provisional Patent Application Serial No. 60/162,200 entitled "Property-Independent Volumetric Flowmeter and Sonic Velocimeter" and filed Oct. 29, 1999, and No. 60/244,100 entitled "Property-Independent Volumetric Flowmeter and Sonic Velocimeter" and filed Oct. 27, 2000. The disclosures of the above-mentioned provisional applications are incorporated herein by reference in their entireties.

BACKGROUND OF THE INVENTION

1. Field of the Invention

This invention pertains to a method and apparatus for accurately and simultaneously determining the volumetric flow rate of a fluid with a single fluidic oscillator without a priori knowledge of the physical properties of the fluid, and for determining the speed of sound in the fluid when the fluid properties are known.

2. Discussion of the Prior Art

Fluidic feedback oscillator flow meters and fluidic sonic oscillators are quite well known in the art (e.g., Horton et al, U.S. Pat. No. 3,185,166; Testerman et al, U.S. Pat. No. 3,273,377; Taplin, U.S. Pat. No. 3,373,600; Villarroel et al, U.S. Pat. No. 3,756,068; Adams, U.S. Pat. No. 3,640,133; Bauer, U.S. Pat. No. 4,244,230; and Zupanick, U.S. Pat. No. 4,150,561). These oscillators are all fundamentally similar devices comprised of a fluidic amplifier (digital or analog) with the outputs fed back on the inputs in such a manner as to produce free running oscillation. The period of oscillation fundamentally depends on three terms: the flow transit time of the fluid particles from the nozzle to the outputs; the feedback time through feedback channels, which is related to the acoustic transmission time; and a jet dynamic response time (see: H. Schaedel, "Fluidic Components and Networks," F. Vieweg & Son, Braunschweig/Weisbaden Germany, 1979). A fluidic flow meter is typically designed in such a manner that: (a) the flow transit time across the amplifier is made relatively long (i.e., by using a low velocity flow over a relatively long transit distance); (b) the acoustic feedback time is made relatively short by making the feedback length very short; and (c) the jet dynamic term is minimized by utilizing a high frequency response amplifier design. Accordingly, the flow transit time is very long compared with acoustic feedback time. In such a design the oscillator frequency is essentially linearly related to the volumetric flow because the flow transit time is related to flow velocity. Since the amplifier nozzle area is known, the product of velocity and area yields volumetric flow. In practice, the acoustic feedback time for most fluids can be designed to be only a few percent of the total flow transit time. Thus, for all intents and purposes, the measured frequency provides a relatively accurate measure of the flow rate, within the few percent represented by the acoustic time delay, regardless of the speed of sound in the fluid (e.g., for different fluids). By juxtaposition of time delays in a fluidic sonic oscillator that can be used as a speed of sound sensor, the acoustic feedback time is made to dominate by using physically long feedback lines; the flow transit time is made as short as possible by using a high velocity stream and short transit distance; and the jet dynamic term is again minimized by using a high frequency response amplifier design. In such a manner the oscillation period (and consequently the operating frequency) is essentially related, within the few percent attributable to the flow transit time, to the speed of sound in the fluid, provided that appropriate corrections are made to compensate for the retarding effects of the typically small dimensions of the feedback passages to account for differences in wall effects due to viscosity and density.

For certain applications, principally in assaying the constituents of a gas mixture (see my U.S. Pat. No. 6,076,392) it is necessary to measure both the flow of the fluid sample stream and the speed of sound in the fluid. A measure of the volumetric flow is required to determine the properties density and viscosity of the fluid sample, and a measure of the speed of sound is required to determine the property specific heat of thew fluid. In the latter case, the speed of sound sensor effectively becomes a gas calorimeter. In some embodiments described in my U.S. Pat. No. 6,076,392, two fluidic oscillators connected in series are employed, one oscillator providing mostly flow rate information and the other mostly speed of sound information. It is important to note that these two oscillator sensors are not completely decoupled because the degree of resolution and accuracy required for successful deconvolution of the composition equations is more than can be provided by each individual oscillator sensor alone. This is due to the abovementioned inherent errors arising from neglecting the small contributions of either flow or speed of sound. To correct for these inaccuracies, the frequencies from the two oscillators are used in an off-line simultaneous solution of sensor equations where, in essence, the speed of sound and flow dependence are solved for simultaneously with density and viscosity. The resultant numerical solution may be cumbersome and complex because of the number of roots that are often within a reasonable solution set. As a result it is often necessary to apply complex hierarchical decision trees to the numerical processing, and consequently the computational burden can become a limiting factor for practical implementation. Thus, when a low cost, lightweight system using a single microprocessor is desired, difficulties can arise. Further, when the oscillators are connected serially there is a time delay between when the first sensor reports an event (e.g., change in gas composition) and the second sensor experiences that same event, such time delay being a function of the transport delay. In order to prevent this out of phase information from affecting any computations, it is important to account for the time delay. Still further, the sonic oscillator, in general having a large volume associated with its feedback lines, requires more time to equilibrate (i.e., has a slower response) than the other sensing elements, further exacerbating any difficulties that may have been associated with the transient response. Additionally, the use of two oscillators often results in a phenomenon known as phase-locking whereby one oscillator may tend to lock into the frequency of the dominant oscillator, resulting in erroneous interpretation of that frequency. Even if phase-locking does not occur, there may often be some interaction which can affect the frequencies of both oscillators.

The technology of ultrasonic flow metering teaches that flow velocity can be determined by measuring the time delay between an acoustic signal injected upstream into a flow and an acoustic sensor disposed a known distance downstream. However, in its simplest form, this technique requires knowledge of the properties of the fluid since the time delay is actually the sum of the flow transit time superimposed on the sonic transit time. Using pairs of acoustic sources and detectors with one signal travelling upstream and the other downstream, subtraction of the inverse of the time delays cancels out the sonic terms, leaving only the flow terms which can be added to provide the acoustic propagation term. In any event, this type of device requires a separate acoustic source and is not particularly amenable to miniaturization for measuring the flow in small or even microchannels.

The present invention resolves the abovementioned difficulties, particularly those of requiring two separate oscillators to determine volumetric flow and speed of sound, by recognizing that both flow and speed of sound are inherently part of the period of the frequency of a single oscillator, and that by using a separate means of measuring one of the component time delays, the other term can be automatically determined.

OBJECTS OF THE INVENTION

It is a primary object of the present invention to provide a method and apparatus utilizing a single fluidic oscillator with two phase-delayed measurements of the oscillating frequency to provide extremely accurate measures of the volumetric flow of the sampled gas and its speed of sound (and consequently its specific heat).

It is another object of the present invention to provide a volumetric flow meter and gas calorimeter using a single fluidic element.

It is a further object of the present invention to provide a method and apparatus utilizing two pairs of sensors to measure an actual time delay in feedback lines to correct the period of a flow meter frequency for changes in feedback delay caused by changes in propagation time due to changes in physical properties of a fluid with different or changing composition.

It is yet a further object of the present invention to utilize two pairs of sensors to measure an actual time delay of a flow stream to directly measure its flow rate, and subsequently to calculate the acoustic propagation velocity regardless of changes in physical properties of the fluid being monitored.

It is a further object of the present invention to provide an analytical method for determining the speed of sound and hence specific heat of a fluid when the fluid is a gas with a known relationship between speed of sound and specific heat.

Another object of the present invention is to provide a highly accurate volumetric flow meter for any fluid, gas or liquid, which is independent of the properties of the fluid being sampled, by direct compensation for the actual acoustic delay in the feedback lines.

Yet another object of the present invention to provide for a very low cost implementation of a flow meter and calorimetric device in order to promote widespread use and to improve the general standards of fluid flow and property measurement.

The above and still further objects, features and advantages of the present invention will become apparent upon consideration of the following detailed description of the specific embodiments thereof, particularly when taken in conjunction with the accompanying drawings wherein like reference numerals in the various figures are utilized to designate like components.

DESCRIPTION OF THE PREFERRED EMBODIMENTS

Figure 1:
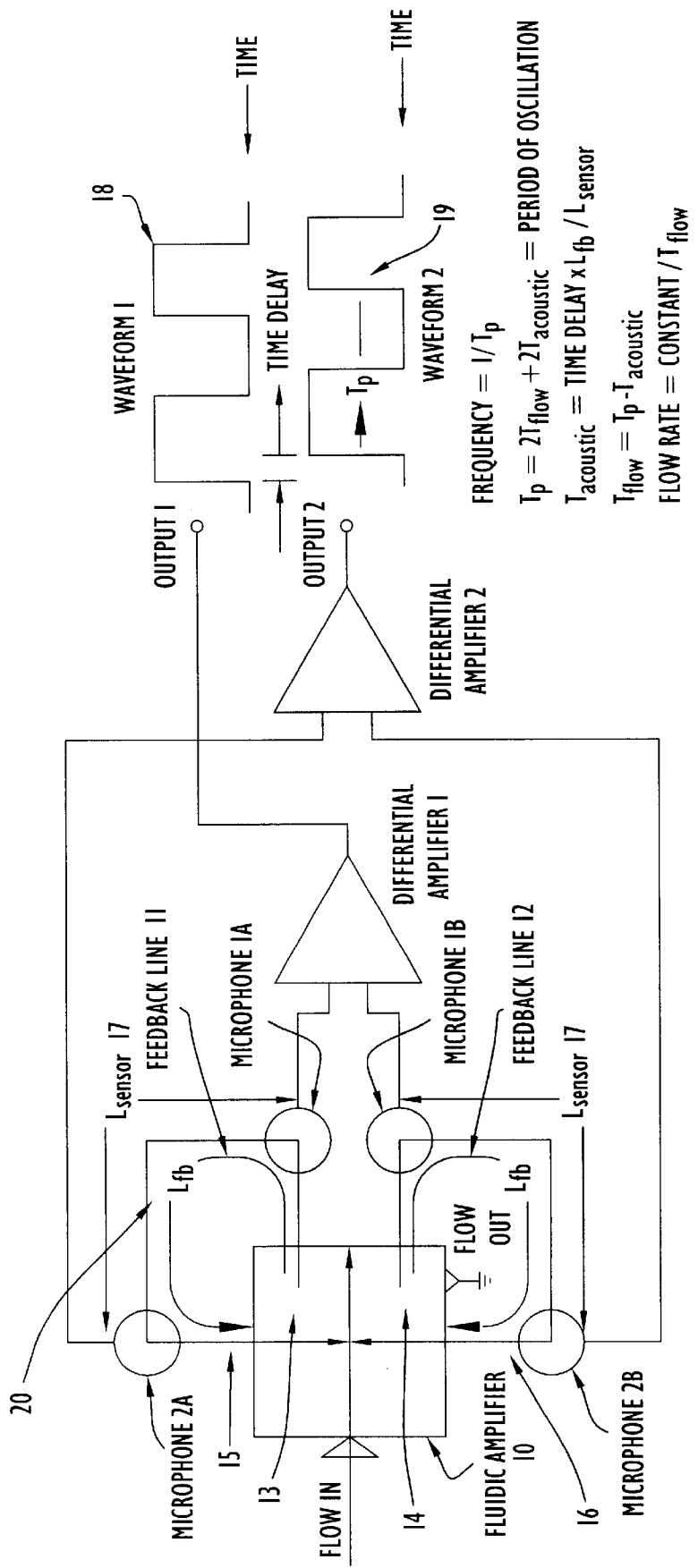
FIG. 1 is a diagram representation of a fluidic feedback oscillator and circuit according to the present invention.

In order to obtain an ultra-accurate (i.e., to four or five significant figures) flow rate measurement from a fluidic flow oscillator, the contribution to the period of oscillation by the feedback time must be determined with the desired accuracy. The frequency of oscillation, and thereby the period of oscillation, of the preferred embodiment of the symmetrical oscillator of the present invention itself is preferably measured with a pair of matched (i.e., identical) microphones physically located symmetrically within respective feedback lines of the fluidic amplifier near the leading edge of the splitter dividing the amplifier into two output channels. Because the output (i.e., pressure and flow) signals in the feedback lines are separated in phase by 180°, a doubling of the measured output amplitude can be achieved by using a matched pair of microphones and utilizing the difference between the voltage output amplitudes. More importantly, however, because of the very high common-mode rejection achieved when matched microphones are employed, external sounds and acoustic frequencies (e.g., sampling pump noise) are picked up by the microphones as in-phase signals that are consequently cancelled out in the difference signal. That is, only the out-of-phase oscillator frequency information is passed through. This first frequency signal defines the period of the oscillator frequency.

A second pair of microphones is located at equal known distances downstream in the two respective feedback channels, the location being such that the effects of any reflections from the terminations of the feedback channels can be ignored. A second signal with the same frequency as the first signal is sensed but is delayed from the first signal by the time interval required for the signal to propagate (acoustically) from the location of the first pair of microphones to the location of the second pair. By measuring the phase difference between the two signals, the propagation time delay can be determined and, because the distance between the microphones is very precisely known, the actual propagation velocity, or phase speed, can be calculated. Since the actual total feedback channel distance (from amplifier output to input) is also known, the feedback time delay portion of the oscillator frequency can be determined. This time delay is subtracted from the period of oscillation so that the sum of the time delay attributable to the flow of the fluid and the known jet dynamic response time is determined. Consequently, the time it takes the flow to traverse from the supply nozzle to the outputs is accurately determined and the flow velocity can thus be calculated within the desired accuracy. As a result, the volumetric flow rate can be precisely determined when the flow velocity is multiplied by the cross-sectional area of the supply nozzle. When the feedback channels are large, the measured propagation velocity approximates the speed of sound.

Alternatively, instead of measuring the feedback propagation time it is possible to measure the flow transit time with a similar set of two independent measurements of the flow transients within a fluidic oscillator. This becomes important when the feedback channels are relatively short and acoustic reflections from the terminations distort or otherwise affect the two sets of microphone pressure sensor waveforms. In this second embodiment of the present invention, two pairs of matched microphones, or even possibly flow sensors such as hot wire or hot film anemometers, are disposed along the length of the flowing oscillating jet of fluid in the interaction region within the fluidic amplifier. As with the first described embodiment, both sensor pairs record the fundamental oscillator frequency which defines the oscillation period comprised of the three fundamental time delays described above in the Background section. Hot wires/films are generally thought to be preferred over pressure sensing microphones in this embodiment because the pressure waveform in the free jet in the interaction region can be reversed from the recovered pressure waveform near the outputs of the amplifier, and difficulties in identifying time event markers other than zero-crossings can be confusing. Again, as in the first described embodiment, a phase difference between the pairs of sensors is measured; however, in this case, the time delay is associated directly with the flow velocity. With the distance between sensor pairs precisely known, the flow velocity is exactly determined. When the flow velocity is multiplied by the supply nozzle cross-sectional area, the result is volumetric flow rate, totally independent of properties of the fluid. With the further knowledge of the total distance across the fluidic amplifier, the transit delay portion of the period of oscillation is subtracted from that period of oscillation, leaving the sum of the feedback time delay (acoustic propagation delay) and the known jet dynamic time constant. The propagation time delay is, once again, correlated to the speed of sound.

These described methods of determining flow and propagation speeds are applicable to both gaseous and liquid fluids. When the fluid is a gas, or more generally when the fluid has a known relationship between speed of sound and specific heat, the specific heat of the fluid may be determined directly from the speed of sound (i.e., acoustic velocity). In general, however, the dimensions of the feedback channels of fluidic oscillators are very small, often approaching microfluidic dimensions (e.g., passages of tens or hundreds of microns in width and/or depth). In such cases the acoustic propagation velocity measured in the oscillator feedback channels is less than the speed of sound because of the retarding viscous and dissipative effects of the fluid motion in the vicinity of the channel walls. Kinsler and Frey ("Fundamentals of Acoustics", Wiley 1982) have shown that the acoustic propagation velocity in the presence of dissipative effects in small channels is proportional to the true sonic velocity reduced by terms containing an effective viscosity coefficient, $\mu_e$, and other terms, so that the true speed of sound, a, can be determined from the following equation:

$$a=c/[1-(\mu_e/\pi f \rho_o)^{1/2}/b_{fb}] \qquad (1)$$

where:
- a=true speed of sound (sonic velocity)
- c=measured acoustic speed of propagation
- f=frequency of oscillation
- $\rho_o$=fluid density
- $b_{fb}$=diameter of channel (hydraulic diameter for rectangular channels).

Kinsler and Frey define the effective viscosity, $\mu_e$, to be:

$$\mu_e=\mu[1+(\gamma-1)(k/c_p\mu^{1/2})]^2 \qquad (2)$$

where:
- $\mu$=dynamic viscosity
- $\gamma$=ratio of specific heats=$c_p/c_v$
- $c_p$=specific heat at constant pressure
- $c_v$=specific heat at constant volume
- k=thermal conductivity.

From the kinetic theory of gasses (e.g., Fung, Y. C. "A First Course in Continuum Mechanics," Prentice-Hall, 1977), thermal conductivity of a gas is defined as being proportional to the product of dynamic viscosity and specific heat, such that:

$$k=1.91 \, c_v \qquad (3)$$

For an ideal gas, the specific heats at constant volume and constant pressure are related through the universal gas constant, $R_o$, and molecular weight, M such that:

$$c_v=c_p-R_o/M. \qquad (4)$$

Finally, the molecular weight is related to the density through an equation of state that includes measured absolute pressure, P, and measured temperature, T. For an ideal gas:

$$\rho_o=PM/R_oT. \qquad (5)$$

Figure 2:
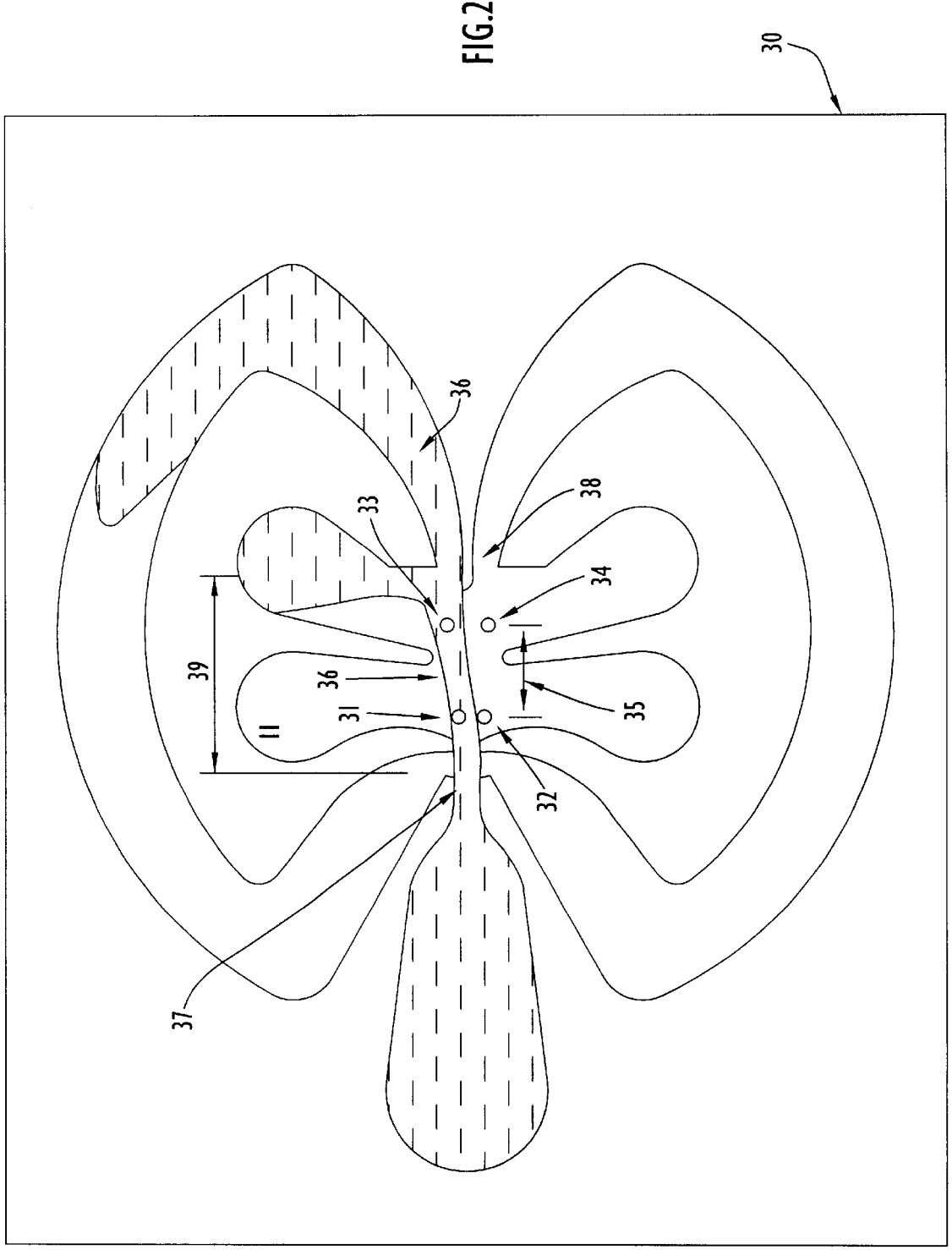
FIG. 2 is a schematic diagram of a fluidic feedback oscillator constructed according to the present invention.

The above equations (1) through (5), in combination with a knowledge of density and viscosity (which, for the gas analyzer disclosed in U.S. Pat. No. 6,076,392, can be obtained once the flow rate is known and pressure drops across an orifice and a capillary are available) form a sufficient set from which the speed of sound, a, and consequently the specific heat at constant pressure, $c_p$, can be obtained from the equations below: Equation (6):

$$a=\frac{2(\mu/\rho_0\pi f)^{\frac{1}{2}}/b_{fb}-1+\{[2(\mu/\rho_0\pi f)^{\frac{1}{2}}/b_{fb}-1]^2+8(1.91/P\pi f)^{\frac{1}{2}}(1.91\mu/f\rho_0^2+L_s/\tau_d)/b_{fb}\}^{\frac{1}{2}}}{[4(1.91/P\pi f)^{\frac{1}{2}}/b]}$$

$$c_p=1/[T(\rho_o/P-1/a^2)] \qquad (7)$$

where:
- $L_s$=distance between microphones in the feedback
- $\tau_d$=time delay between first and second signals The main components of the present invention are: a fluidic amplifier oscillator, and two sets of sensors located at separate locations in either the feedback channels, as shown in FIG. 1, or in the jet flow region, as shown in FIG. 2. These figures illustrate the fluidic oscillators and sensors, and, in the case of FIG. 1, the differential amplifiers used to provide output signals applied to a microprocessor, or the like. The microprocessor itself is not illustrated in view of the fact that any conventional microprocessor can be employed when suitably programmed to embody the computations set forth in the equations presented herein. It will be appreciated that such programming is well within the skill of software designers.

Referring specifically to FIG. 1, in accordance with a preferred embodiment of the present invention, a symmetrical fluidic amplifier 10 is provided with feedback lines 11 and 12 to cause it to function as a free-running fluidic feedback oscillator. Specifically, feedback line 11 interconnects one amplifier output port (e.g., the upper output port in the figure) 13 and the corresponding upper amplifier control port 15. The other feedback line interconnects the corresponding other (lower) output port 14 and the lower control port 16. A first pair of matched microphones includes microphones 1A and 1B located at output ports 13 and 14, respectively. A second pair of matched microphones included microphones 2A and 2B located a known distance L(17) downstream from respective microphones 1A and 1B in feedback lines 11 and 12, respectively. The voltage signals from microphones 1A and 1B are applied to electronic differential amplifier 1 which provides a first output signal representing the voltage difference between the two applied signals from microphones 1A and 1B, respectively. Similarly, the voltage signals from microphones 2A and 2B are applied to electronic differential amplifier 2 which provides a second output signal representing the voltage difference between the two applied signals from microphones 2A and 2B, respectively. The second output signal is delayed from the first by the time it takes for the feedback signal to propagate acoustically and travel in the feedback line from the location of the first pair of microphones to the second (i.e., microphones 1A to microphone 2A in feedback line 11; microphone 1B to microphone 2B in feedback line 12).

Voltage waveform 1 (18) is the output signal from differential amplifier 1, and voltage waveform 2 (19) is the output signal from differential amplifier 2, both of which are applied to a microprocessor (not shown), which may be a Pentium PC, or the equivalent, suitably programmed to perform the computations described by the equations presented herein. The total acoustic propagation feedback time is obtained by multiplying the Time Delay between the two signals by the ratio of feedback path length (20) to the microphone spacing length (17) ($L_{fb}/L_{sensor}$). The result is, $T_{acoustic}$. The period of oscillation is made up of two half-cycles. Each half cycle is composed of the transit time for a signal to propagate across the amplifier by flow and the time it takes for the signal to acoustically propagate back through the feedback lines to initiate the second half of the cycle. Because of the nature of jet deflection, the signal propagates across the amplifier at one-half the flow velocity. Therefore, the flow transit time, $T_{flow}$, through amplifier 10 is determined by subtracting the acoustic feedback time from one-half the period of oscillation, $T_{period}/2$. The volumetric flow rate, Q, which is the product of flow velocity and supply nozzle cross-sectional area, is determined by noting that: (1) the flow velocity is twice the signal propagation velocity, which is the distance across amplifier 10, $x_{sp}$, divided by the transit time $T_{flow}$, and (2) the area of the nozzle from which the flow emanates is the product of the nozzle width, bs, and the nozzle height, h, so that the flow, Q, is:

$$Q=2x_{sp}b_s h/T_{flow}. \quad (8)$$

The total acoustic propagation feedback time, $T_{acoustic}$, is used to determine the speed of sound by dividing the total feedback length, $L_{fb}$ by $T_{acoustic}$. Using the previously cited equations relating the actual speed of sound to the acoustic velocity through the effective viscosity, the speed of sound, a, and hence specific heat, $c_p$, of the gas are determined from, $$a = \frac{L_{fb}/T_{acoustic}}{[1-(\mu_e/\pi f \rho_0)^{\frac{1}{2}}/b_{fb}]} \quad (9)$$

$$c_p=1/[T(\rho o/P-1/a^2)]. \quad (10)$$

Referring now to the embodiment of a fluidic feedback oscillator in FIG. 2, comprises a fluidic amplifier 30 having a power nozzle 37 arranged to issue the operating fluid into that upstream end of an interaction region. The downstream end of that region is defined by a flow splitter 38 axially aligned with nozzle 37 and separating two output channels.

The output channels are connected in positive feedback relation to respective control ports to cause the amplifier to operate in an oscillation mode. The flow velocity, and hence the volumetric flow rate in fluidic amplifier 30, are measured directly by measuring the time delay between the signals from two pairs of flow sensors shown as the upstream pair 31 and 32 and the downstream pair 33 and 34 separated by a known distance 35. It should be appreciated that in this embodiment the flow is also determined independently of the fluid properties. Flow sensors 31–34 may be hot wire anemometers disposed into and across the flow stream 36 or may be hot films embedded in the bounding surfaces of the fluidic amplifier 30. The output from either pair of sensors can be used to measure the oscillator frequency. In this embodiment the sum of the acoustic propagation time and the amplifier time constant is determined by subtracting the flow transit time, from half the period of oscillation. The flow transit time is the measured time delay between sensors 31 and 33 (and between sensors 32 and 34) multiplied by the ratio of the distance from nozzle 37 to splitter 38 (i.e., the nozzle-to-splitter distance 39) to the sensor separation distance 35. The speed of sound is obtained from the frequency-to-flow relationship for the oscillator which is characterized by passing a calibration gas of known properties through and recording the frequency and flow measured with a reference flow meter, and fitting a quadratic equation in (1/Q) relating the three time constants to the period of oscillation where the amplifier constant $K_{amp}$ has been determined a prioiri:

$$T_{period}=1/f=2T_{flow}+2T_{acoustic}+2T_{amplifier} \quad (11)$$

$$1/f=2L_{fb}/c+4X_{sp}b_s h/Q+K_{amp}f(\rho,u)/Q^2 \quad (12)$$

where:

$X_{sp}$=supply nozzle-to-splitter distance 37

$b_s$=supply nozzle width h=supply nozzle height $K_{amp}$=amplifier response constant $f(\rho,u)$=known functional relationship with density and viscosity for amplifier response.

The acoustic propagation speed c is thereby determined from the above equation and the speed of sound is estimated as before from the known relationships for propagation in small channels.

The computations and processing of measured parameters described herein are readily performed by commonly available microprocessors (e.g., personal computers) suitably programmable for the task by software engineers of ordinary skill. Accordingly, the computer hardware and software are not disclosed. The calculations can, if desired, also be performed by hand.

It will be appreciated that, although the preferred embodiment of the invention uses two pairs of microphones or other sensors, such pairing is preferred because of the cancellation of in-phase noise that is picked up by the sensors. In certain applications, however, it may be desirable to use only two single sensors, spaced as described, thereby foregoing the noise cancellation capability. In either case, flow rate measurement is achieved independently of properties of the fluid.

From the foregoing description it will be appreciated that the invention makes available a novel flow meter in which measurement is totally independent of properties of the measured fluid.

Having described preferred embodiments of new and improved property-independent flow meter and sonic velocimeter, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. Apparatus for determining flow rate of a flowing fluid independently of properties and composition of the fluid and simultaneously for determining the speed of sound in the fluid, comprising:
   a fluidic feedback oscillator including nozzle means for establishing an oscillating stream of the fluid, input means for changing directional movement of said stream of fluid, output means located a known distance from said nozzle means for receiving said stream as a function of stream directional movement, and feedback means of known feedback length for directing at least a portion of the received stream from said output means to said input means to create oscillatory directional movement of said stream;
   first and second independent sensor means for monitoring oscillation of the fluid stream and providing respective first and second sensor signals representing specified stream oscillation characteristics, said first sensor means being positioned at a first location in said fluid stream, said second sensor means being positioned at a second location in said fluid stream spaced downstream from said first location by a known sensor spacing; and
   processor means comprising:
      means responsive to said first and second sensor signals for computing the period of oscillation of said stream and computing a sensing time delay between sensing of said specified stream oscillation characteristics by the first sensor and sensing of the same specified oscillation characteristics by said second sensor;
      means responsive to said computed sensing time delay and said known sensor spacing for computing the propagation velocity of said fluid stream in said oscillator;
      means responsive to said computed propagation velocity and said known feedback length for computing the feedback time delay through said feedback means;
      means for computing the flow time delay of the stream between said nozzle means and said output means by subtracting said computed feedback time delay from said computed period of oscillation; and
      means for computing the flow velocity of said stream by dividing said known distance by said computed flow time delay.

2. The apparatus of claim 1 wherein said nozzle means comprises a nozzle of known cross-sectional area; and wherein said processor means further comprises means for computing the volumetric flow rate of said stream by multiplying said known cross-sectional area by said computed flow velocity.

3. The apparatus of claim 1 wherein said fluidic feedback oscillator comprises a laminar proportional fluidic amplifier wherein said feedback means comprise feedback flow channel means connected between said output means and said input means.

4. The apparatus of claim 1 wherein said first and second independent sensor means are pressure sensing elements.

5. The apparatus of claim 4 wherein said first and second independent sensor means are microphones.

6. The apparatus of claim 1 wherein said fluidic oscillator is substantially symmetrical about a longitudinal axis, and wherein:
   said output means comprises first and second output ports separated on respective opposite sides of said axis by a flow splitter disposed on said axis;
   said input mean comprises first and second input ports disposed on respective opposite sides of said nozzle means;
   said feedback means comprises first and second feedback flow channels of substantially the same size and configuration connecting, respectively, said first output port to said first input port and said second output port to said second input port; and
   wherein said first sensor means comprises a pair of first and second matched sensors located at symmetrically disposed locations on opposite sides of said axis for providing respective first and second signals as a function of sensed pressure or flow, and a first differential amplifier responsive to the amplitude difference between said first and second signals for providing said first sensor signal; and
   wherein said second sensor means comprises a pair of third and fourth matched sensors located at symmetrically disposed locations on opposite sides of said axis for providing respective third and fourth signals as a function of sensed pressure or flow, and a second differential amplifier responsive to the difference between said third and fourth signals for providing said second sensor signal.

7. The apparatus of claim 6 wherein sensors are matched microphones located in said feedback flow channels for sensing pressure therein.

8. The apparatus of claim 7 wherein said feedback flow channels are sufficiently long relative to said known distance that said computed propagation velocity approximates the speed of sound in said fluid.

9. The apparatus of claim 6 wherein said sensors are flow sensing elements located in or adjacent said oscillating stream.

10. The apparatus of claim 9 wherein said flow sensing elements are hot wire or hot film anemometers.

11. The apparatus of claim 6 wherein said first and third sensors are located in said first feedback flow channel and are spaced by said known sensor spacing, and wherein said second and fourth sensors are located in said second feedback flow channel and are spaced by said known sensor spacing.

12. The apparatus of claim 6 wherein said sensors are located along said stream in the region of the amplifier where the jet is oscillating.

13. A method for determining flow rate of a flowing fluid independently of properties and composition of the fluid and providing the capability for simultaneously determining the speed of sound in the fluid, said method comprising the steps of:
   (a) in a fluidic feedback oscillator:
      (a.1) establishing from a nozzle an oscillating stream of the fluid,
      (a.2) with input means, changing directional movement of said stream of fluid,
      (a.3) at output means located a known distance from said nozzle, receiving said stream as a function of stream directional movement, and
      (a.4) directing at least a portion of the received stream from said output means through a feedback channel of known length to said input means to create oscillatory directional movement of said stream;
   (b) monitoring oscillation of the fluid stream with first and second independent sensor means, spaced in said oscillator by a known sensor spacing, and providing respective first and second sensor signals representing specified stream oscillation characteristics;

(c) in response to said first and second sensor signals:
  (c.1) computing the period of oscillation of said stream;
  (c.2) computing a sensing time delay between sensing of said specified stream oscillation characteristics by the first sensor and sensing of the same specified oscillation characteristics by said second sensor;
  (c.3) from said computed sensing time delay and said known sensor spacing, computing the propagation velocity of said fluid stream in said oscillator;
  (c.4) from said computed propagation velocity and said known feedback length, computing the feedback time delay through said feedback means;
  (c.5) computing the flow time delay of the stream between said nozzle means and said output means by subtracting said computed feedback time delay from said computed period of oscillation; and
  (c.6) computing the flow velocity of said stream by dividing said known distance by said computed flow time delay.

14. The method of claim 13 wherein said nozzle means comprises a nozzle of known cross-sectional area; and wherein step (c) further comprises the step (c.7) of computing the volumetric flow rate of said stream by multiplying said known cross-sectional area by said computed flow velocity.

15. The apparatus of claim 1 wherein the fluid is a gas.

16. The apparatus of claim 1 wherein the fluid is a liquid.

17. Apparatus for determining flow rate of a flowing fluid independently of properties and composition of the fluid and simultaneously determining the speed of sound in the fluid, comprising:

a fluidic feedback oscillator including nozzle means for establishing an oscillating stream of the fluid, input means for changing directional movement of said stream of fluid, output means located a known distance from said nozzle means for receiving said stream as a function of stream directional movement, and feedback means of known feedback length substantially greater than said known distance for directing at least a portion of the received stream from said output means to said input means to create oscillatory directional movement of said stream;

first and second independent sensor means for monitoring oscillation of the fluid stream and providing respective first and second sensor signals representing specified stream oscillation characteristics, said second sensor means being spaced downstream from said first sensor means in said oscillator by a known sensor spacing;

processor means comprising:
    means responsive to said first and second sensor signals for computing the period of oscillation of said stream and computing a sensing time delay between sensing of said specified stream oscillation characteristics by the first sensor and sensing of the same specified oscillation characteristics by said second sensor; and
    means for computing the flow velocity of said stream by multiplying said known sensor spacing by said computed sensing time delay.

18. The apparatus of claim 17 wherein said nozzle means comprises a nozzle of known cross-sectional area; and wherein said processor means further comprises means for computing the volumetric flow rate of said stream by multiplying said known cross-sectional area by said computed flow velocity.

19. A method for determining flow rate of a flowing fluid independently of properties and composition of the fluid and providing the capability for simultaneously determining the speed of sound in the fluid, said method comprising the steps of:

(a) in a fluidic feedback oscillator:
  (a.1) establishing from a nozzle an oscillating stream of the fluid,
  (a.2) with input means, changing directional movement of said stream of fluid,
  (a.3) at output means located a known distance from said nozzle, receiving said stream as a function of stream directional movement, and
  (a.4) directing at least a portion of the received stream from said output means through a feedback channel of known length to said input means to create oscillatory directional movement of said stream;

(b) monitoring oscillation of the fluid stream with first and second independent sensor means, spaced from one another along said stream in said oscillator by a known sensor spacing, and providing respective first and second sensor signals representing specified stream oscillation characteristics;

(c) in response to said first and second sensor signals:
  (c.1) computing the period of oscillation of said stream; and
  (c.2) computing a sensing time delay between sensing of said specified stream oscillation characteristics by the first sensor and sensing of the same specified oscillation characteristics by said second sensor; and (d) computing the flow velocity of said stream by multiplying said known sensor spacing by said computed sensing time delay.

20. The method of claim 19 wherein said nozzle means comprises a nozzle of known cross-sectional area; and further comprising the step of computing the volumetric flow rate of said stream by multiplying said known cross-sectional area by said computed flow velocity.

21. The method of claim 19 wherein the fluid is a gas.

22. The method of claim 19 wherein the fluid is a liquid.

23. The method of claim 19 further comprising the step of utilizing the computed propagation velocity to calculate the specific heat of the fluid.

24. Apparatus for determining flow rate of a flowing fluid independently of properties and composition of the fluid comprising:

a fluidic feedback oscillator including nozzle means for establishing an oscillating stream of the fluid, input means for changing directional movement of said stream of fluid, output means located a known distance from said nozzle means for receiving said stream as a function of stream directional movement, and feedback means of known feedback length for directing at least a portion of the received stream from said output means to said input means to create oscillatory directional movement of said stream;

first and second independent sensor means for monitoring oscillation of the fluid stream and providing respective first and second sensor signals representing specified stream oscillation characteristics, said first sensor means being positioned at a first location in said fluid stream, said second sensor means being positioned at a second location in said fluid stream spaced downstream from said first location by a known sensor spacing; and processor means responsive to said first and second sensor signals for computing the flow rate of said stream.

25. The apparatus of claim 24 wherein said first and second independent sensor means are pressure sensing elements.

26. The apparatus of claim 24 wherein said first and second independent sensor means are microphones.

27. The apparatus of claim 26 wherein said microphones are located in said feedback means for sensing pressure therein.

28. The apparatus of claim 27 wherein said processor means includes means for computing propagation velocity of fluid in said fluid stream in said oscillator, and wherein said feedback means comprises at least one feedback flow channel sufficiently long relative to said known distance that said computed propagation velocity approximates the speed of sound in said fluid.

29. A method for detennining flow rate of a flowing fluid independently of properties and composition of the fluid comprising:

establishing an oscillating fluid stream;

monitoring oscillation of the fluid stream with first and second independent sensor means spaced in said oscillator by a known sensor spacing along said stream, and providing respective first and second sensor signals representing specified stream oscillation characteristics;

in response to said first and second sensor signals; computing the flow rate of said stream.

* * * * *